United States Patent [19]

Leyshon et al.

[11] Patent Number: 4,969,153
[45] Date of Patent: Nov. 6, 1990

[54] LASER TUBE AND POWER SUPPLY

[75] Inventors: Frank A. Leyshon, Cambridge; David A. Watson, New Concord; Herbert D. McClain, Quaker City, all of Ohio

[73] Assignee: NCR Corporation, Dayton, Ohio

[21] Appl. No.: 365,874

[22] Filed: Jul. 24, 1989

[51] Int. Cl.$^5$ ............................................. H01S 3/03
[52] U.S. Cl. ..................................... 372/65; 372/107
[58] Field of Search .................. 372/24, 26, 65, 38, 372/107; 235/473, 467, 470

[56] References Cited

U.S. PATENT DOCUMENTS

| | | | |
|---|---|---|---|
| 4,251,798 | 2/1981 | Swartz et al. | 340/146.3 |
| 4,387,297 | 6/1983 | Swartz et al. | 235/462 |
| 4,460,120 | 7/1984 | Shepard et al. | 235/472 |
| 4,496,831 | 1/1985 | Swartz et al. | 235/472 |
| 4,513,354 | 4/1985 | Abel | 361/399 |
| 4,575,625 | 3/1986 | Knowles | 378/24 |
| 4,607,156 | 8/1986 | Koppenaal et al. | 235/472 |
| 4,736,095 | 4/1988 | Shepard et al. | 235/472 |
| 4,805,175 | 2/1989 | Knowles | 372/24 |
| 4,845,350 | 7/1989 | Shepard et al. | 372/24 |

Primary Examiner—Léon Scott, Jr.
Attorney, Agent, or Firm—Wilbert Hawk, Jr.; Albert L. Sessler, Jr.; Richard W. Lavin

[57] ABSTRACT

A laser power supply includes a support member in which is mounted a laser tube for outputting a laser light beam and a printed circuit board containing the power supply circuits. A slidably mounted cover member encloses the support member and the laser tube and includes a pair of lens members for diverging and attenuating the laser light beam. A pair of spring clip members mounted on the support member releasable secure the laser tube to the support member while electrically connecting the laser tube to the printed circuit board.

9 Claims, 4 Drawing Sheets

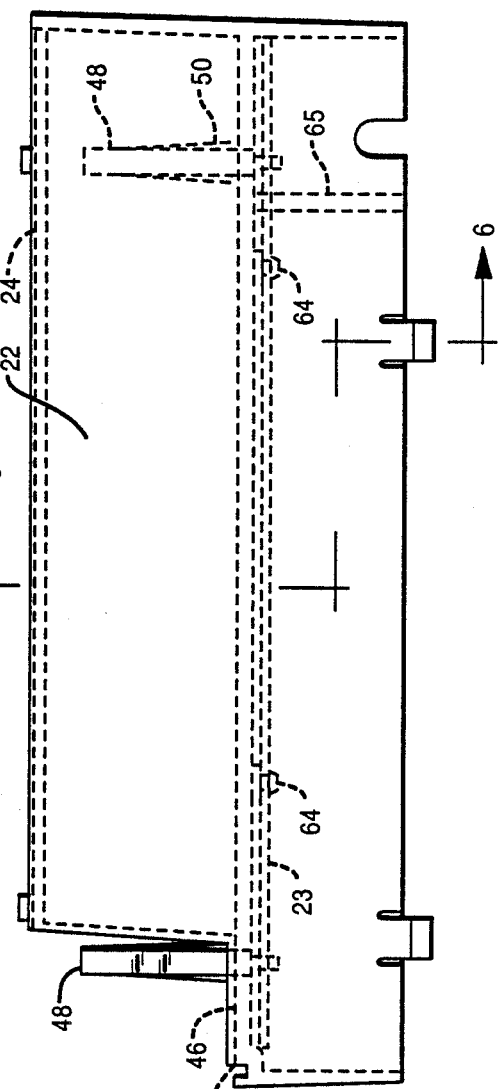

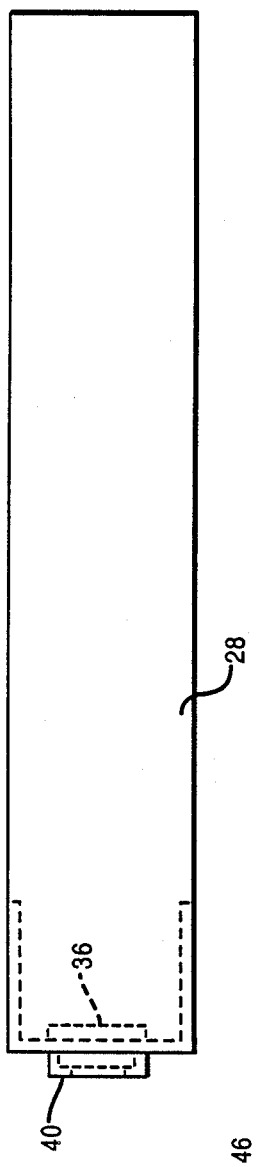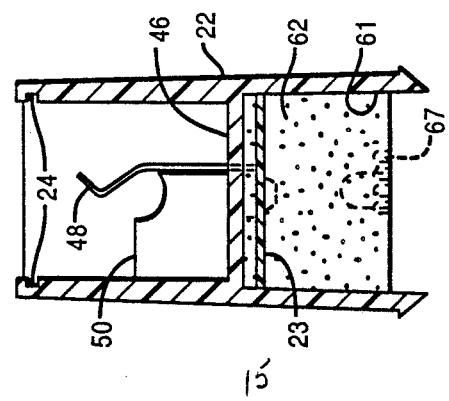

LASER TUBE AND POWER SUPPLY

BACKGROUND OF THE INVENTION

The present invention relates to power supplies and, more particularly, to a laser power supply in which the laser tube and the power supply comprise a single structure.

In present day optical bar code scanners which are utilized in checkout counters for reading coded labels attached to the purchased merchandise items, a demand has arisen for the development of compact scanners which can be used where the checkout operator is in a sitting position during the checkout operation. An example of this type of optical scanner can be found in U.S. Pat. No. 4,797,551 which is assigned to the assignee of the present application. It was found that the power supply and the laser source were the principal elements that needed replacement during the operating life of the scanner and that such elements required the scanner to be removed from the counter to provide such replacement. This resulted in an interruption of the checkout operation which negatively affected the sales of the scanner. In order to construct a laser power supply that could be easily replaced in the field, the power supplies were constructed in modular form but it was found that the output power of the laser tube varied between modules thus producing uneven scanning results.

SUMMARY OF THE INVENTION

There is provided, in accordance with the present invention, a power supply for use in a laser bar code scanner which comprises a support member including a printed circuit board containing a high voltage power supply circuit. The circuit board is mounted within the support member and sealed by potting material. A pair of spring clip members are secured to the printed circuit board and extend through the potting material and a floor portion of the support member to a position above the floor portion. A laser tube is secured to the clip members after which a cover member is attached to the support member enclosing the laser tube. The spring clip members are molded to the floor portion to align the opposite ends of the laser tube so as to output the laser light beam along a predetermined path. The cover member includes a lens member which is aligned with the output of the laser tube to diverge the laser output beam. The cover member further includes an attenuating lens member to reduce the output power of the laser tube to a predetermined level.

It is therefore an object of the present invention to provide a compact power supply module which contains both the laser source and the power supply in the same structure.

It is another object of the present invention to provide a compact power supply module which is interchangeable with other modules and has a laser output whose power level is the same for all the modules.

It is another object of the present invention to provide such a power supply which is simple in construction and low in cost.

These and other objects, features, and advantages of the present invention will become apparent from the following description and the attached drawings.

BRIEF DESCRIPTION OF THE DRAWINGS

FIG. 2 is an end elevational view of the cover member;

FIG. 3 is a side elevational view of the cover member;

FIG. 4 is an end elevational view of the support member;

FIG. 5 is a side elevational view of the support member;

FIG. 6 is a sectional view taken on line 6—6 of FIG. 5;

FIG. 7 is a top elevational view of the cover member;

FIG. 8 is a top elevational view of the support member;

DETAILED DESCRIPTION OF THE PREFERRED EMBODIMENT

Figure 1:
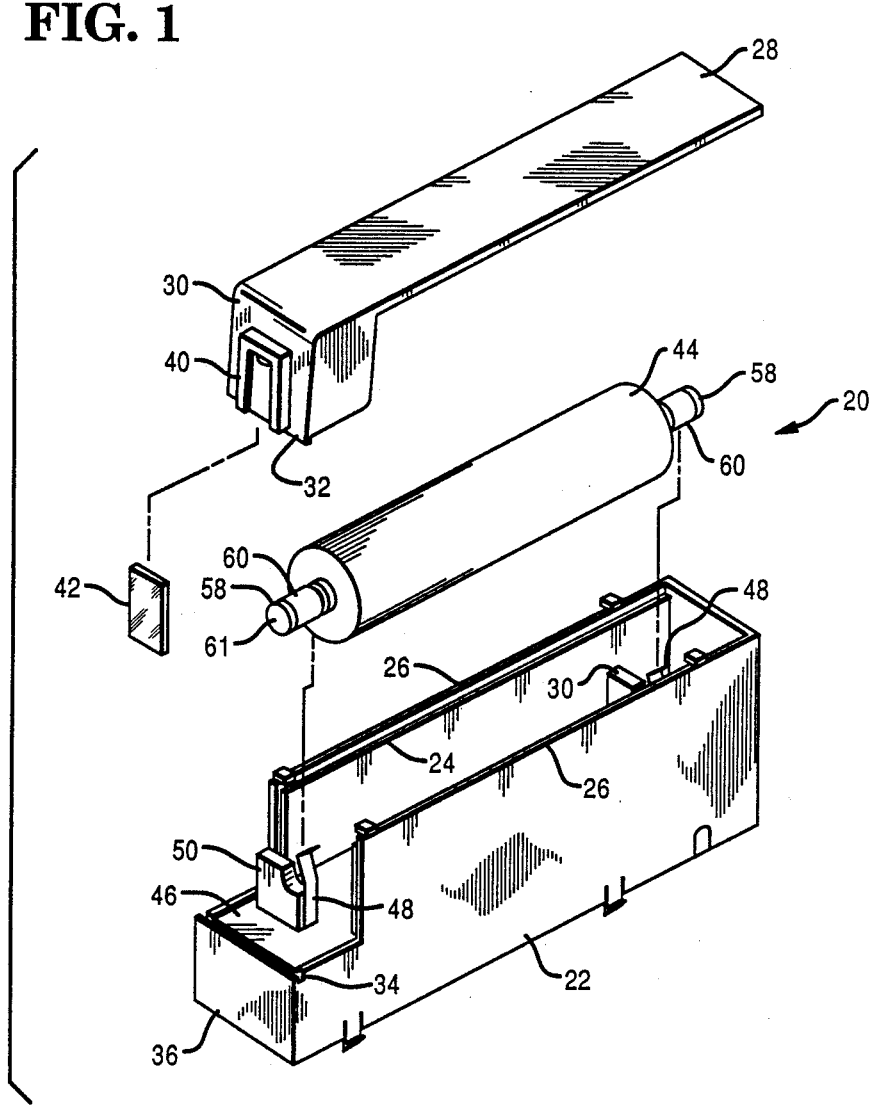
FIG. 1 is an exploded perspective view of the power supply module of the present invention.
Figure 9:
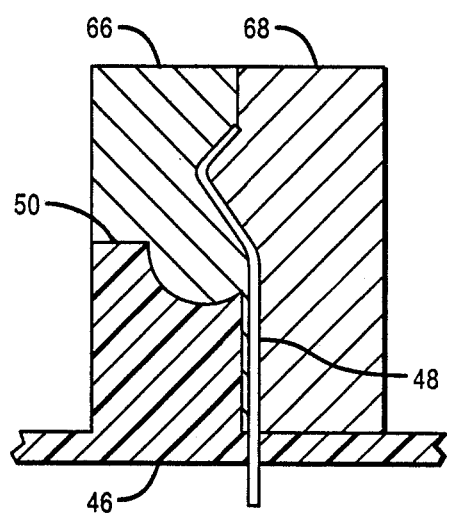
FIG. 9 is a partial side sectional view of the support member showing the location of the steel blocks used in molding the spring clip members to the floor portion of the support member.

Referring now to the drawings, there are shown various views of the power supply module of the present invention generally indicated by the numeral 20 (FIG. 1) which includes a support member 22 (FIGS. 1, 4–6 inclusive and 8) in which is located a printed circuit board 23 (FIGS. 4–6 inclusive) containing the power supply circuits for the power supply. Slidably mounted within slots 24 (FIGS. 4–6 inclusive) extending along the top edges 26 of the support member is a cover member 28 (FIGS. 1–3 inclusive and 7) having a depending front portion 30 whose lower edge 32 is located within a slot 34 (FIGS. 1,4 and 5) extending across the top front edge of the support member 22. Included in the front portion 30 is an aperture 38 (FIG. 2) which is surrounded by a holder extension portion 40 (FIGS. 1–3 inclusive and 7) in which is slidably positioned a plastic lens member 42 (FIG. 1) for diverging the laser beam of a laser tube member 44 (FIG. 1) mounted in the support member 22 in a manner that will be described more fully hereinafter. Secured to the rear edge of the front portion 30 in any conventional manner such as gluing is a glass attenuating lens member 36 (FIG. 3) which focuses the light beam while limiting the output power of the laser light beam to a predetermined level. This construction insures that each power supply module will provide the same power output.

As shown in FIGS. 1, 4–6 inclusive and 8, the support member 22 includes a floor portion 46 in which is mounted a pair of spring clip members 48. Mounted in the floor portion 46 adjacent each of the spring clip members is a guide member 50 having a round cutout portion 52 (FIG. 4) which coacts with a bent portion 54 of its associated spring clip member to form a capture area 56 for capturing an extension portion 58 (FIG. 1) extending out from the opposite ends of the laser tube member 44 holding the tube member in an aligned operating position within the support member. The extension portions 58 include a metal band 60 which provides the electrical connection between the laser tube member 44 and the spring clip members which clip members extend through the floor portion 46 to be connected to the circuit board 23. As best seen in FIG. 6, the lower cavity 61 of the support member 22 is filled with a potting material 62 comprising a two part epoxy material such as Stycast 2075 Black which is a trademark of Emerson and Comings. Inc. of Agawam, Mass. The potting material 62 fills the cavity 61 below the floor portion 46 enclosing the printed circuit board 23 and providing a solid base for the power supply module 20. Secured to the lower surface of the floor portion 46 are a pair of depending support members 64 which support the printed circuit board 23 prior to the time the potting material 62 is poured into the cavity 61 in the support member 22. The support member 22 and cover member 28 may be molded of any type of polycarbonate plastic material.

Referring now to 9, there is shown a partial side sectional view of the steel blocks used in molding the spring clip members 48 to the floor portion 46 of the support member 22. The support member 22 is molded in the form shown in section in FIG. 6. Since it is critical that the laser tube member 44 be properly aligned with the optical path in which is located the optics associated with the bar code reader, the mounting of the spring clip members 48 is required to be very accurate with respect to each other and the guide members 50. To accomplish this, a pair of steel blocks 66, 68 are inserted sideways within the mold (not shown) to engage the clip member 48 in the mold for the support member. The block 66 includes a cavity which forms the guide members 50. After the molding operation has occurred, the steel blocks are removed in the same manner that they were installed. The support members 64 are then glued to the lower surface of the floor portion 46 after which the printed circuit board 23 is connected to the lower end of the spring clip members 48 and the support members 64. The potting material 62 is then poured into the cavity 61 (FIG. 6) to complete the construction of the module. The support member 22 further includes a wall portion 65 (FIGS. 5 and 8) which forms one side of the cavity 61. The wall portion 65 includes a plurality of circular openings 67 (FIGS. 6 and 8) through which are threaded wires (not shown) from the printed circuit board 23 after which the potting material 62 is poured into the cavity 61.

It can thus be seen that there has been provided by the present invention a compact power supply module for a bar code scanner which includes both the source of the scanning light beams and the power supply for the source thus reducing the number of parts that need to be assembled to construct the scanner. The pickup wires normally found in laser power supplies connecting the laser tube to the power supply have been eliminated thereby increasing the reliability of the power supply.

Although the presently preferred embodiment of the invention has been described, it will be understood that various changes may be made within the scope of the appended claims.

What is claimed is:

1. A self-contained removable power supply for a source of scanning light beams comprising:
    a boxlike housing member having a floor portion mounted intermediate its top and lower surfaces forming upper and lower enclosed cavities;
    a printed circuit board mounted on said floor portion and extending into said lower cavity for outputting electrical signals;
    electrical connecting meams engaging said printed circuit board and extending through said floor portion into said upper cavity for transmitting said electrical signals;
    a source of scanning laser light beams supported in said upper cavity by said electrical connecting means and enabled, in response to receiving said electrical signals, to output a laser light beam; and
    a cover member slideably mounted on said housing member and forming the top surface of said housing member, said cover member including means positioned adjacent said source for diverging the laser light beams of said source and attenuating and focusing the laser light beam.

2. The power supply of claim 1 in which the housing member is fabricated of a plastic material and in which said electrical connecting means comprises elongated metal support members mounted in said floor portion and extending into both cavities for interconnecting said circuit board and said source of scanning light beams.

3. The power supply of claim 2 which includes a potting material which fills the lower cavity of the housing member and encloses the printed circuit board.

4. The power supply of claim 2 in which the cover member includes a depending front portion which encloses the source of scanning light beams, said front portion including an aperture through which the scanning light beams are outputted by said source.

5. The power supply of claim 4 in which the front portion further includes a housing portion located on one side of the front portion adjacent said aperture and in which said diverging means is slidably positioned.

6. The power supply of claim 5 which includes attenuating and focusing means secured to the opposite side of the front portion of the cover member adjacent said aperture.

7. The power supply of claim 2 in which said metal support members comprise a pair of spring clip members mounted adjacent opposite ends of said housing member, said housing member further including a pair of guide members each positioned adjacent one of said clip members, each of said guide members having a recessed portion which cooperates with its associated clip member to engage and position said source of scanning light beams within the housing member.

8. The power supply of claim 7 in which said source of scanning light beams is a laser tube.

9. The power supply of claim 8 in which said metal support members comprise a pair of spring clip members mounted on opposite ends of the floor portion, said support member further including a pair of guide members each positioned adjacent one of said clip members, each of said guide members having a recessed portion which cooperates with its associated clip member to engage and position said laser member within said support member.

* * * * *

UNITED STATES PATENT AND TRADEMARK OFFICE
CERTIFICATE OF CORRECTION

PATENT NO. : 4,969,153

DATED : November 6, 1990

INVENTOR(S) : Frank A. Leyshon et al.

It is certified that error appears in the above-identified patent and that said Letters Patent is hereby corrected as shown below:

Column 4, line 4, delete the word "meams" and
         substitute --means--.

Signed and Sealed this

Thirty-first Day of March, 1992

Attest:

HARRY F. MANBECK, JR.

Attesting Officer     Commissioner of Patents and Trademarks